United States Patent
Montojo et al.

(10) Patent No.: US 9,014,110 B2
(45) Date of Patent: Apr. 21, 2015

(54) ENABLING HALF-DUPLEX OPERATION

(75) Inventors: Juan Montojo, Nuremberg (DE); Peter Gaal, San Diego, CA (US); Wanshi Chen, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 13/550,834

(22) Filed: Jul. 17, 2012

(65) Prior Publication Data

US 2013/0021954 A1 Jan. 24, 2013

Related U.S. Application Data

(60) Provisional application No. 61/508,879, filed on Jul. 18, 2011, provisional application No. 61/511,815, filed on Jul. 26, 2011.

(51) Int. Cl.
*H04L 5/16* (2006.01)
*H04L 5/14* (2006.01)
*H04L 5/00* (2006.01)

(52) U.S. Cl.
CPC .. *H04L 5/16* (2013.01); *H04L 5/14* (2013.01); *H04L 5/0028* (2013.01); *H04L 5/006* (2013.01); *H04L 5/0085* (2013.01); *H04L 5/0092* (2013.01); *H04L 5/0055* (2013.01)

(58) Field of Classification Search
CPC ........... H04L 5/14; H04L 5/16; H04L 5/0028; H04L 5/0092
USPC ............................ 370/276, 277, 329; 455/450
See application file for complete search history.

(56) References Cited

U.S. PATENT DOCUMENTS

| 8,305,943 | B2 | 11/2012 | Khandekar et al. |
| 2007/0041347 | A1* | 2/2007 | Beale et al. ................. 370/335 |
| 2009/0092066 | A1* | 4/2009 | Chindapol et al. ........... 370/277 |
| 2009/0135748 | A1* | 5/2009 | Lindoff et al. ................ 370/296 |
| 2010/0008332 | A1 | 1/2010 | Balachandran et al. |
| 2010/0142417 | A1 | 6/2010 | Kim et al. |
| 2010/0226290 | A1* | 9/2010 | Kwak et al. .................. 370/278 |
| 2011/0013506 | A1 | 1/2011 | Ishii et al. |

(Continued)

FOREIGN PATENT DOCUMENTS

| JP | 2006054597 A | 2/2006 |
| JP | 2009194910 A | 8/2009 |

(Continued)

OTHER PUBLICATIONS

Machine Translation of KR 2010135681 A.*

(Continued)

*Primary Examiner* — Paul H Masur
(74) *Attorney, Agent, or Firm* — Patterson & Sheridan, L.L.P.

(57) ABSTRACT

Half-duplex (HD) operations enable low cost implementations of LTE terminals. Traditionally, HD operations may be linked to a particular frequency band which may not allow a mix of full-duplex (FD) and HD terminals in the same frequency band. Therefore, certain aspects of the present disclosure provide techniques for enabling coexistence, in a given frequency band, of HD and FD terminals, by introducing frequency bands designated for HD operation and overlapping existing frequency bands designated for FD operation.

44 Claims, 10 Drawing Sheets

Overlapping frequency band for half duplex

(56) References Cited

U.S. PATENT DOCUMENTS

| | | | |
|---|---|---|---|
| 2012/0020256 A1 | 1/2012 | Tujkovic et al. | |
| 2012/0063373 A1* | 3/2012 | Chincholi et al. | 370/281 |
| 2012/0257551 A1* | 10/2012 | Diao et al. | 370/280 |

FOREIGN PATENT DOCUMENTS

| | | | |
|---|---|---|---|
| JP | 2009219110 A | | 9/2009 |
| JP | 2010154238 A | | 7/2010 |
| JP | 2010541381 A | | 12/2010 |
| JP | 2011041303 A | | 2/2011 |
| KR | 2010135681 A | * | 12/2010 |
| WO | WO-2007092788 A2 | | 8/2007 |
| WO | WO-2007137191 A2 | | 11/2007 |
| WO | WO-2008023596 A1 | | 2/2008 |
| WO | 2009042158 A2 | | 4/2009 |
| WO | WO-2011084753 A1 | | 7/2011 |

OTHER PUBLICATIONS

International Search Report and Written Opinion—PCT/US2012/047182—ISA/EPO—Oct. 12, 2012.

3rd Generation Partnership Project; Technical Specification Group Radio Access Network; Evolved Universal Terrestrial Radio Access (E-UTRA) and Evolved Packet Core (EPC); Common test environments for User Equipment (UE) conformance testing (Release 9), 3GPP TS 36.508, Jun. 24, 2011, V9.5.0, 4.4.7.1 Common contents of HRPD Overhead messages, 326 Pages.

3rd Generation Partnership Project; Technical Specification Group Radio Access Network; Evolved Universal Terrestrial Radio Access (E-UTRA); Multiplexing and channel coding (Release 9), 3GPP TS 36.212, Oct. 3, 2010, V9.3.0, 63 Pages.

* cited by examiner

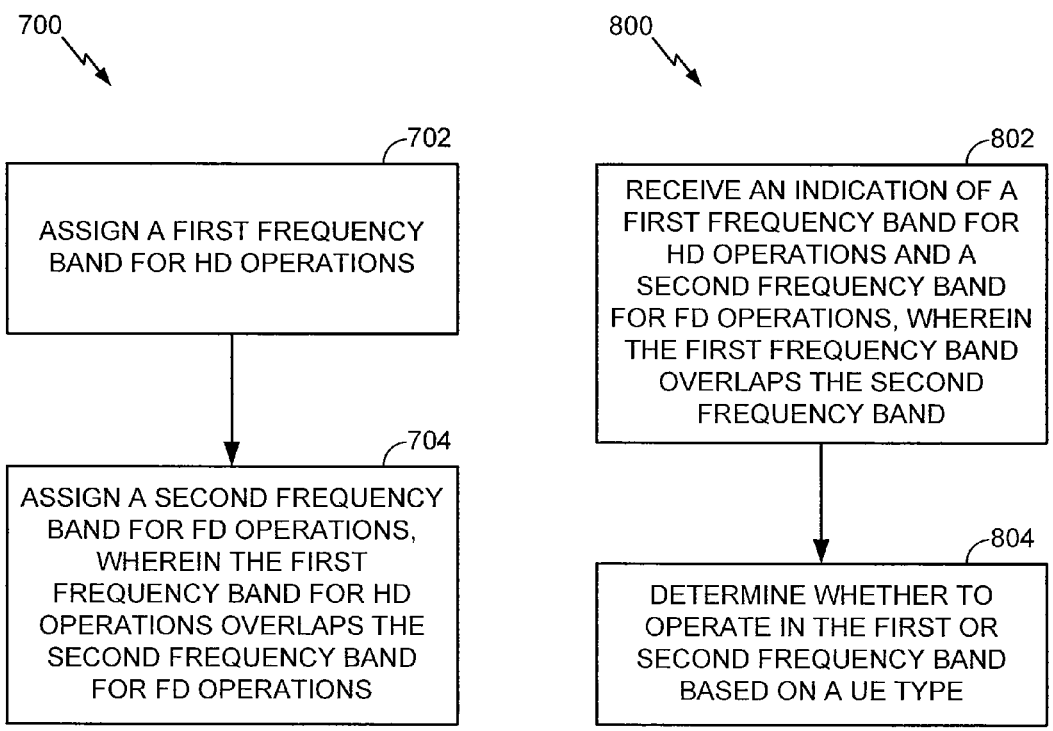

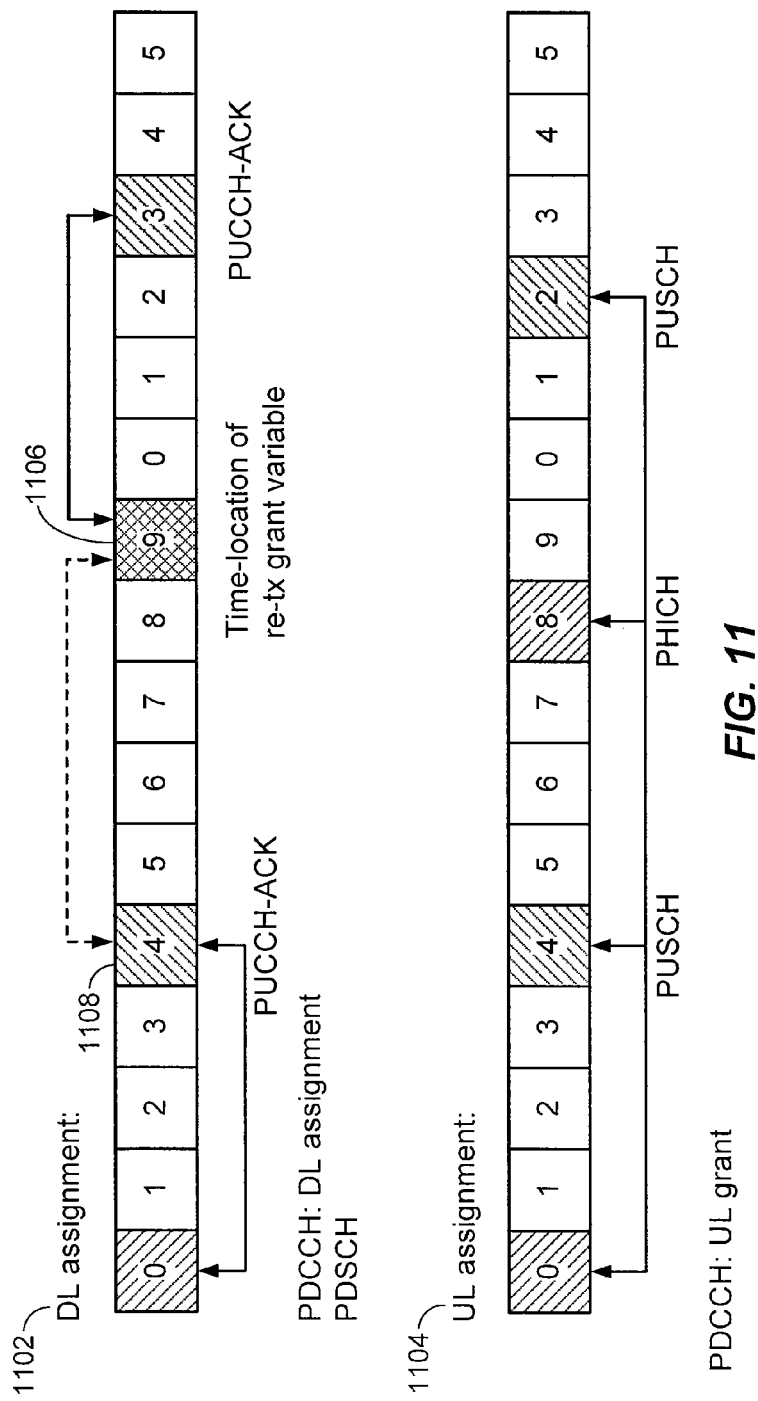
FIG. 11
FIG. 12

ENABLING HALF-DUPLEX OPERATION

CROSS-REFERENCE TO RELATED APPLICATION

This application claims priority to U.S. Provisional Application Ser. Nos. 61/508,879 and 61/511,815, filed on Jul. 18, 2011 and Jul. 26, 2011, respectively, which are expressly incorporated by reference herein in their entirety.

BACKGROUND

I. Field

Certain aspects of the present disclosure generally relate to wireless communications and, more particularly, to techniques for enabling coexistence, in a given frequency band, of half-duplex (HD) and full-duplex (FD) terminals.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the present disclosure provide a method for enabling coexistence of half-duplex (HD) operations and full-duplex (FD) operations in a same carrier. The method generally includes assigning a first frequency band for HD operations, and assigning a second frequency band for FD operations, wherein the first frequency band for HD operations overlaps the second frequency band for FD operations.

Certain aspects of the present disclosure provide an apparatus for enabling coexistence of HD operations and FD operations in a same carrier. The apparatus generally includes means for assigning a first frequency band for HD operations and means for assigning a second frequency band for FD operations, wherein the first frequency band for HD operations overlaps the second frequency band for FD operations.

Certain aspects of the present disclosure provide an apparatus for enabling coexistence of HD operations and FD operations in a same carrier. The apparatus generally includes at least one processor and a memory coupled to the at least one processor. The at least one processor is generally configured to assign a first frequency band for HD operations and assign a second frequency band for FD operations, wherein the first frequency band for HD operations overlaps the second frequency band for FD operations.

Certain aspects of the present disclosure provide a computer-program product for enabling coexistence of HD operations and FD operations in a same carrier. The computer-program product generally includes a computer-readable medium having code for assigning a first frequency band for HD operations and assigning a second frequency band for FD operations, wherein the first frequency band for HD operations overlaps the second frequency band for FD operations.

Certain aspects of the present disclosure provide a method for enabling coexistence of HD operations and FD operations in a same carrier. The method generally includes receiving an indication of a first frequency band for HD operations and a second frequency band for FD operations, wherein the first frequency band overlaps the second frequency band, and determining whether to operate in the first or second frequency band based on a user equipment (UE) type.

Certain aspects of the present disclosure provide an apparatus for enabling coexistence of HD operations and FD operations in a same carrier. The apparatus generally includes means for receiving an indication of a first frequency band for HD operations and a second frequency band for FD operations, wherein the first frequency band overlaps the second frequency band and means for determining whether to operate in the first or second frequency band based on a UE type.

Certain aspects of the present disclosure provide an apparatus for enabling coexistence of HD operations and FD operations in a same carrier. The apparatus generally includes at least one processor and a memory coupled to the at least one processor. The at least one processor is generally configured to receive an indication of a first frequency band for HD operations and a second frequency band for FD operations, wherein the first frequency band overlaps the second frequency band and determine whether to operate in the first or second frequency band based on a UE type.

Certain aspects of the present disclosure provide a computer-program product for enabling coexistence of HD operations and FD operations in a same carrier. The computer-program product generally includes a computer-readable medium having code for receiving an indication of a first frequency band for HD operations and a second frequency band for FD operations, wherein the first frequency band overlaps the second frequency band and determining whether to operate in the first or second frequency band based on a UE type.

Certain aspects of the present disclosure provide a method for wireless communications. The method generally includes determining an uplink transmission overlaps with a downlink transmission in a subframe, and controlling transmissions with one or more HD UEs such that only one of the uplink transmission or the downlink transmission is performed in the subframe with one or more of the UEs.

Certain aspects of the present disclosure provide an apparatus for wireless communications. The apparatus generally includes means for determining an uplink transmission overlaps with a downlink transmission in a subframe and means for controlling transmissions with one or more HD UEs such that only one of the uplink transmission or the downlink transmission is performed in the subframe with one or more of the UEs.

Certain aspects of the present disclosure provide an apparatus for wireless communications. The apparatus generally includes at least one processor and a memory coupled to the at least one processor. The at least one processor is generally configured to determine an uplink transmission overlaps with a downlink transmission in a subframe and control transmissions with one or more HD UEs such that only one of the uplink transmission or the downlink transmission is performed in the subframe with one or more of the UEs.

Certain aspects of the present disclosure provide a computer-program product for wireless communications. The computer-program product generally includes a computer-readable medium having code for determining an uplink transmission overlaps with a downlink transmission in a subframe and controlling transmissions with one or more half-duplex HD UEs such that only one of the uplink transmission or the downlink transmission is performed in the subframe with one or more of the UEs.

BRIEF DESCRIPTION OF THE DRAWINGS

FIG. 7 illustrates example operations for enabling coexistence of HD operations and FD operations in a same carrier, in accordance with certain aspects of the present disclosure.

FIG. 8 illustrates example operations, in accordance with certain aspects of the present disclosure.

FIGS. 11-12 illustrate the impact of DL assignments and UL grants in a HD operation, according to certain aspects of the present disclosure.

DETAILED DESCRIPTION

Half-duplex (HD) operations enable low cost implementations of LTE terminals. Traditionally, HD operations may be linked to a particular frequency band which may not allow a mix of full-duplex (FD) and HD terminals in the same frequency band. Therefore, certain aspects of the present disclosure provide techniques for enabling coexistence, in a given frequency band, of HD and FD terminals, by introducing frequency bands designated for HD operation and overlapping existing frequency bands designated for FD operation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

Figure 1:
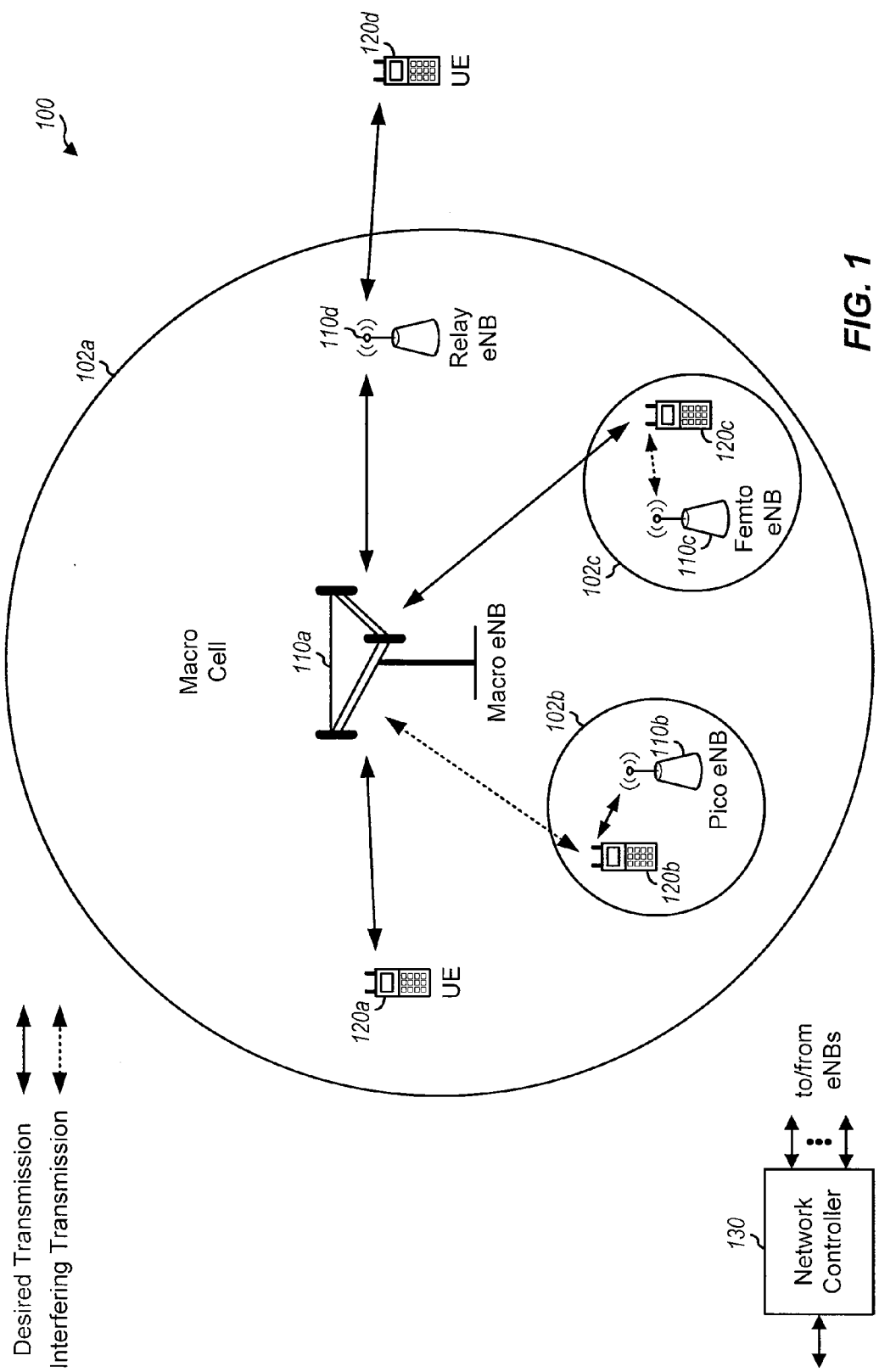
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
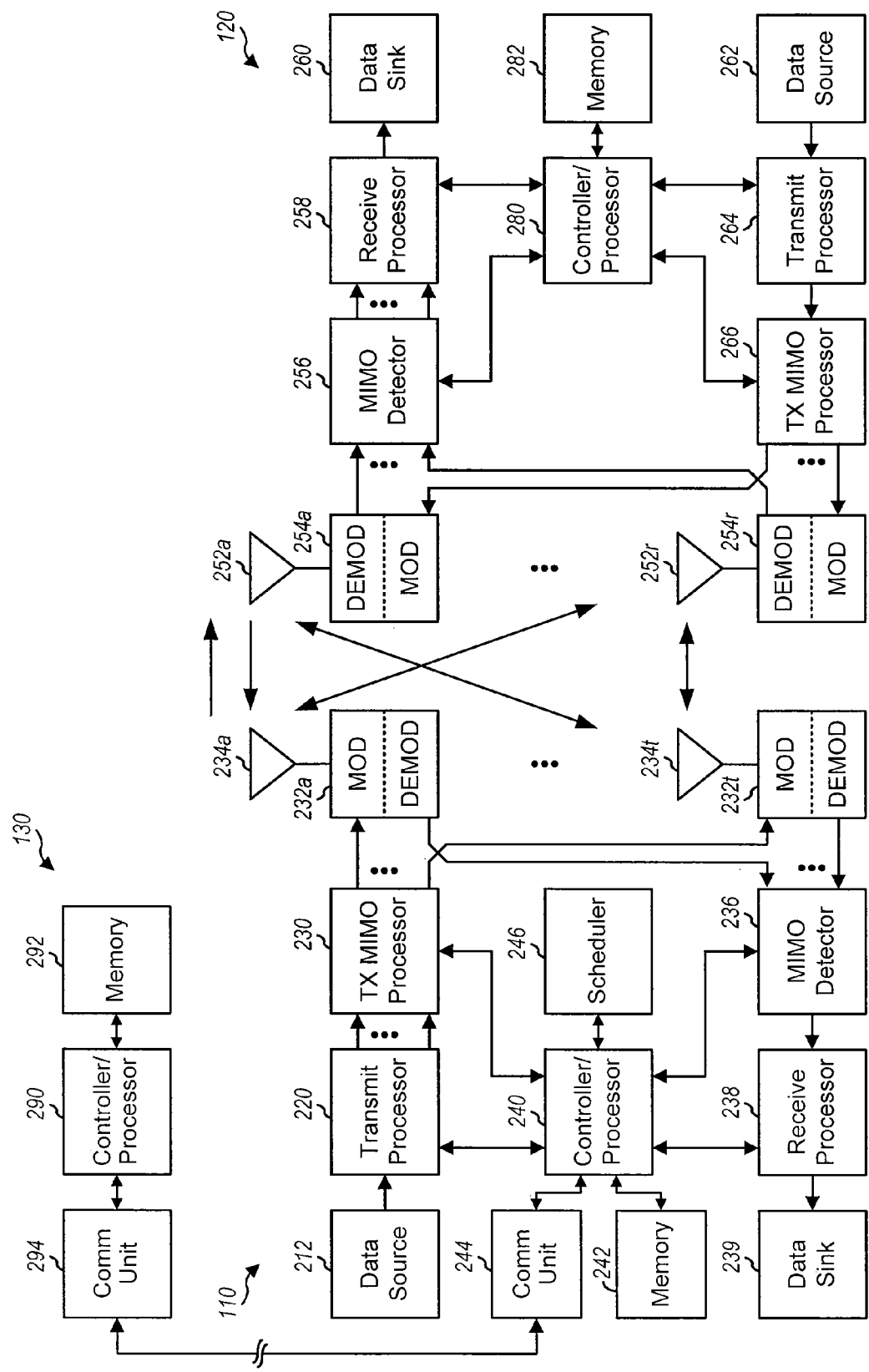
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals such as UE-RS and/or data in the resource blocks may be precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
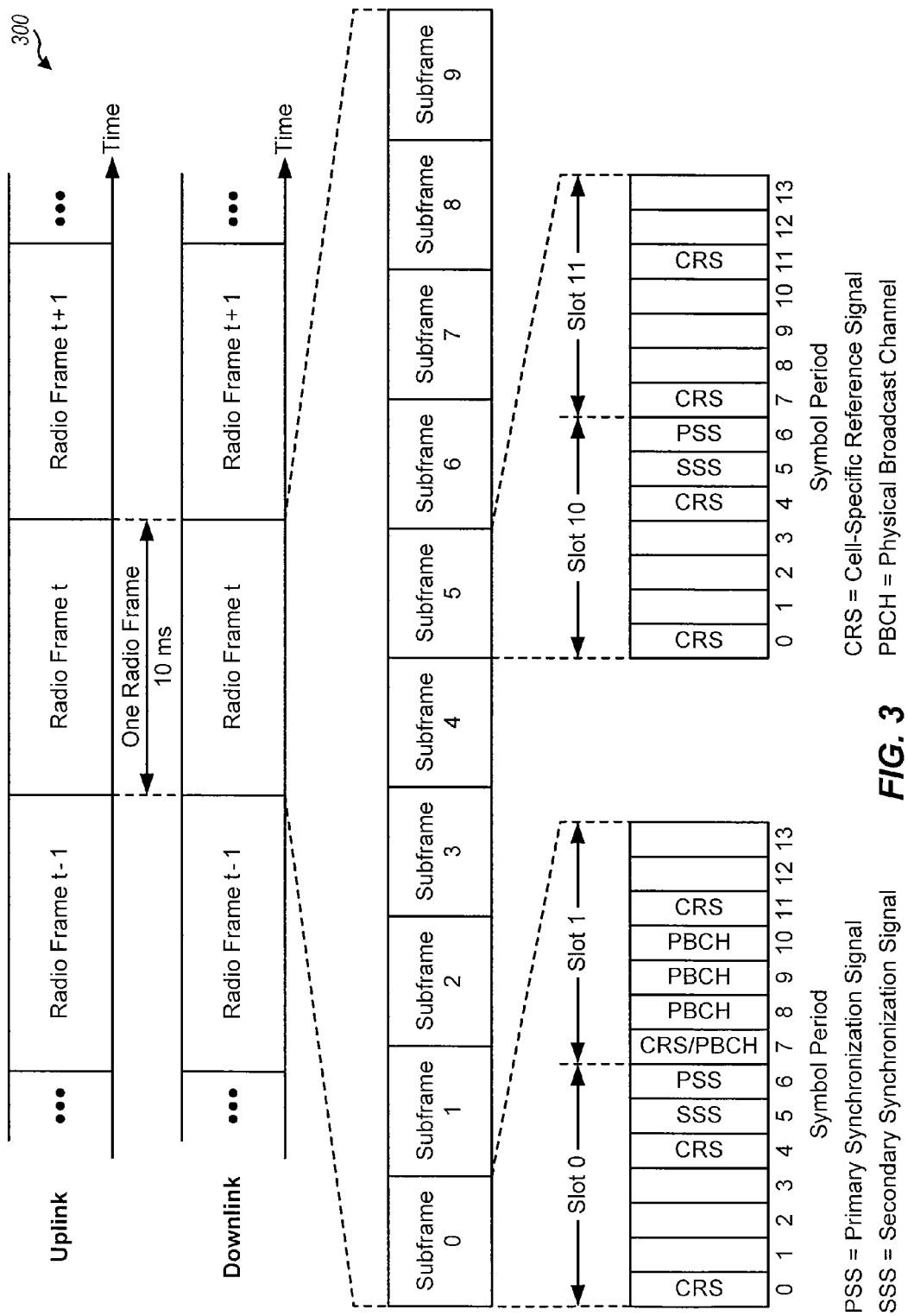
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
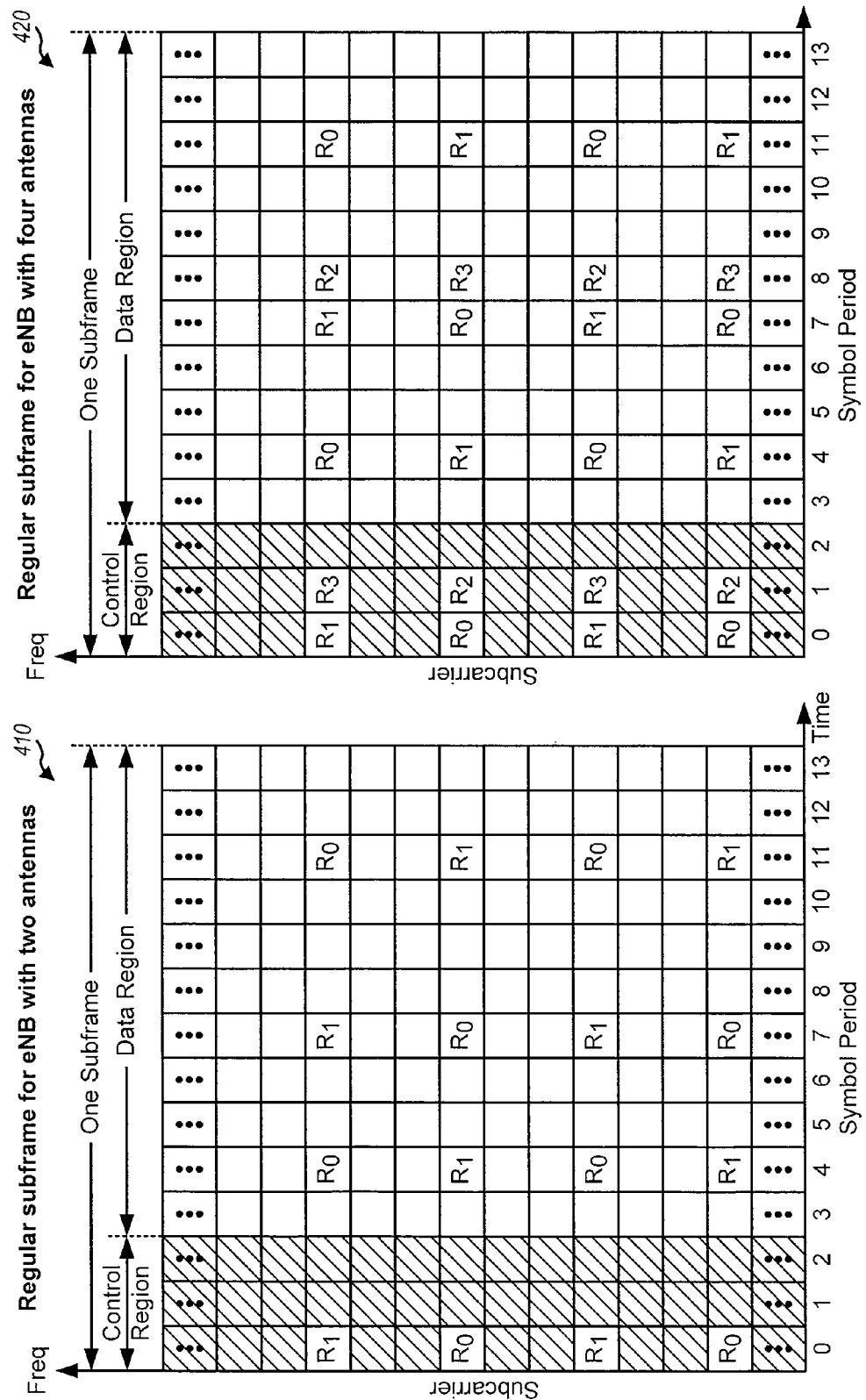
FIG. 4 illustrates two exemplary subframe formats for the downlink, in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈ {0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

LTE Rel-8 supports a frame structure for frequency division duplex (FDD) (e.g., FIG. 3) and a frame structure for time division duplex (TDD). The frame structure for FDD may provide support for full-duplex (FD) and half-duplex (HD) operation modes. While for FD operations there may be no restrictions about when a user equipment (UE) may transmit or receive, for HD operations, the UE may only transmit or receive at a given point in time. HD operations were introduced in Rel-8 of LTE to enable low cost implementations of LTE terminals comparable to those of GSM (e.g., an FDD HD system). The primary cost savings from HD operations may stem from the absence of a duplexer. Even though HD operations provide cost-savings at the terminal side, the infrastructure needs to support the operation mode.

For HD FDD operations, a guard period may be created by the UE by not receiving the last part of a downlink subframe immediately preceding an uplink subframe from the same UE (e.g., non-zero transition time). For HD operations, the UL transmission timing may be aligned by not receiving the last part of the downlink subframe. For some embodiments, an eNB may use this knowledge to adjust the DL transmission rate whenever the eNB schedules the HD UE for the UL immediately following a DL transmission.

Traditionally, HD operations may be linked to a particular frequency band which may not make possible the mix of FD and HD terminals in the same frequency band. Therefore, HD operation may only be supported in frequency bands entirely dedicated to this operation type. In other words, one cell may only support transmission on one band. Therefore, there may be no perceived need for the network indication of the HD support as it is linked to the frequency band.

Figure 5:
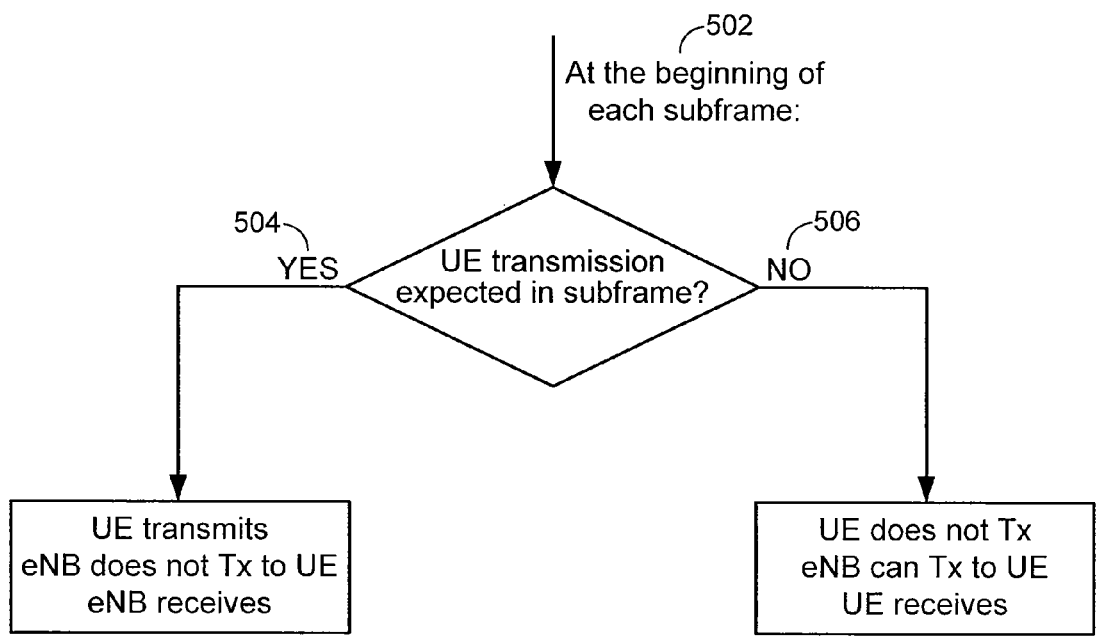
FIG. 5 illustrates an example decision tree for LTE half-duplex (HD) operations that may be performed by a UE, according to certain aspects of the present disclosure.

FIG. 5 illustrates an example decision tree for LTE HD operations that may be performed by a UE, according to certain aspects of the present disclosure. The HD operations in LTE may be regarded as mainly an implementation issue not requiring air-interface specifications. At 502, at the beginning of every subframe (assuming a zero transition time from transmit to receive or vice versa), the UE may determine whether or not it has to transmit any channel or signal in the subframe. With a non-zero transition time, this determination may be made before the end of the previous subframe. At 504, if the UE determines it has to transmit something, the UE may use this subframe for transmission purposes, and an eNB may not transmit to the UE. Otherwise, at 506, the UE may use this subframe for reception (i.e., the eNB may transmit to the UE). As illustrated in FIG. 5, the UE may prioritize its transmissions before any reception. LTE HD operation may require the UE and the eNB to continuously check the need or expectation for the UE to transmit, to determine whether the UE will be able to receive in a given subframe. Since there is not a fixed structure in the time-domain waveform for HD operation support, LTE may support concurrent support of FD and HD devices.

The eNB (e.g., scheduler) may know when the UE has to transmit something in a given subframe and, therefore, the eNB may be expected to use this information to determine when to schedule UE transmissions and receptions. Since the UE transmissions may not be affected by the HD operation, there may be no need to specify any special UE behavior from the UE transmitter standpoint (e.g., regular UL operation). For the DL, however, not all the subframes may be available for the UE to receive or for the eNB to transmit to the given UE. However, the eNB behavior may not need to be specified.

For some embodiments, for concurrent operation of FD and HD in the same frequency band, a new frequency band (e.g., new band number) may be created for HD operations, overlapping an existing frequency band for FD operations, with corresponding signaling of the two bands from the network. For certain aspects, the new frequency band for HD operations may completely overlap the existing frequency band for FD operations. In other words, a particular frequency band may be overloaded with an FD designation and a HD designation. For certain aspects, the new frequency band for HD operations may have a narrower bandwidth than the existing frequency band for FD operations, and the two bands may overlap for the narrower bandwidth. Therefore, FD UEs may effectively operate in the FDD FD band and HD UEs may effectively operate in the FDD HD band. For certain aspects, the eNB may include two band numbers in overhead messages, allowing for simultaneous operation of FD and HD UEs. For some embodiments, an indication of HD support may be added to the network signaling.

Figure 6:
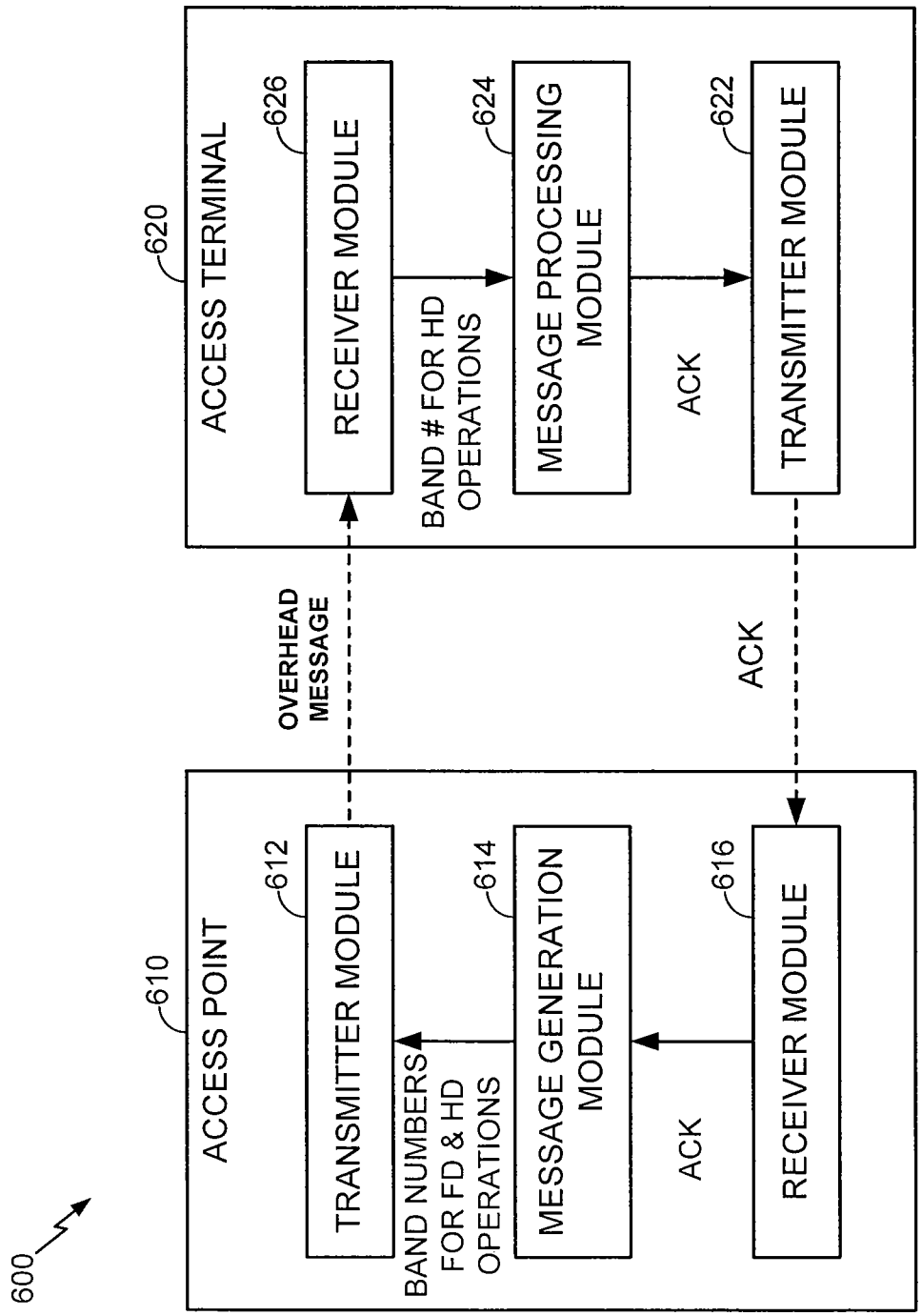
FIG. 6 illustrates an example system with an access point and an access terminal, capable of broadcasting a network indication of a capability for supporting FD and HD operations on a frequency band, in accordance with certain aspects of the present disclosure.

FIG. 6 illustrates an example system 600 with an access point 610 and an access terminal 620 (e.g., HD UE), capable of broadcasting a network indication of a capability for supporting FD and HD operations on a frequency band, in accordance with certain aspects of the present disclosure. As illustrated, the access point 610 may include a message generation module 614 for generating an overhead message for indicating a band number for HD operations and a band number for FD operations. The overhead message may be transmitted in a downlink subframe, via a transmitter module 612, to the HD UE 620.

The HD UE 620 may receive the overhead message via a receiver module 626 and determine the frequency band for HD operations via a message processing module 624. After receiving and processing the overhead message, the HD UE 620 may construct and transmit an acknowledgment according to the HD band number, via a transmitter module 622, to the access point 610 in an uplink subframe. The access point 610 may receive the acknowledgment via a receiver module 616.

Without the network capability to convey to the UEs that a network does not support HD operation in a given band, a HD UE may be camping in a particular frequency band in LTE idle mode without any problem/restriction and without realizing that HD operation is not supported by the network. For example, a HD UE may roam to a place where a particular frequency band is not used in HD mode but in FD mode. In such a case, the network may realize the HD support for this band operation from the reported UE capability from the UE and may bar operation in that frequency band to that terminal. The HD UE may realize this mismatch only when trying to go to LTE connected mode. Therefore, according to certain aspects of the present disclosure, the network capability may be broadcasted.

FIG. 7 illustrates example operations 700 for enabling coexistence of HD operations and FD operations in a same carrier, in accordance with certain aspects of the present disclosure. The operations 700 may be performed, for example, by an eNB. At 702, the eNB may assign a first frequency band for HD operations.

At 704, the eNB may assign a second frequency band for FD operations, wherein the first frequency band for HD operations overlaps the second frequency band for FD operations. For some embodiments, the frequency band for HD operations may have a first band number and the second frequency band for FD operations may have a second band number, wherein the first and second band numbers may be transmitted in an overhead message. The first and second band numbers may allow for simultaneous operation of FD UEs and HD UEs. For certain aspects, the eNB may receive, from a UE, an indication of whether the UE supports HD operations or FD operations and, based on the indication, the eNB may schedule the UE in the first or second band.

For certain aspects, the first frequency band for HD operations may completely overlap the second frequency band for FD operations, such that assignment of the first and second frequency bands generally includes assigning a frequency band with the first band number and the second band number. For certain aspects, the first frequency band for HD operations may have a narrower bandwidth than the second frequency band for FD operations. For some embodiments, the eNB may broadcast a network indication in the first frequency band, wherein the broadcast may indicate a capability for supporting the HD operations on the frequency band.

For certain aspects, the eNB may broadcast a network indication in the second frequency band for FD operations, wherein the broadcast indicates whether there is support for HD operations. If the broadcast indicates there is no support for HD operations, the eNB may deny access to a UE that only supports HD operations.

FIG. 8 illustrates example operations 800, in accordance with certain aspects of the present disclosure. The operations 800 may be performed, for example, by a UE. At 802, the UE may receive an indication of a first frequency band for HD operations and a second frequency band for FD operations, wherein the first frequency band overlaps the second frequency band. For certain aspects, the UE may receive a first band number corresponding to the first frequency band and a second band number corresponding to the second frequency band, wherein the first and second band numbers may be received in an overhead message.

At 804, the UE may determine whether to operate in the first or second frequency band based on a UE type (e.g., whether the UE is a FD UE or a HD UE). Therefore, the first and second band numbers may allow for simultaneous operation of FD UEs and HD UEs. For certain aspects, the UE may receive a network indication (e.g., in the second frequency band for FD operations) indicating whether there is network support for HD operations. In other words, if an HD UE does not receive such a network indication, the HD UE may perform network acquisition operations with another base station that does support HD operations.

Figure 9A:
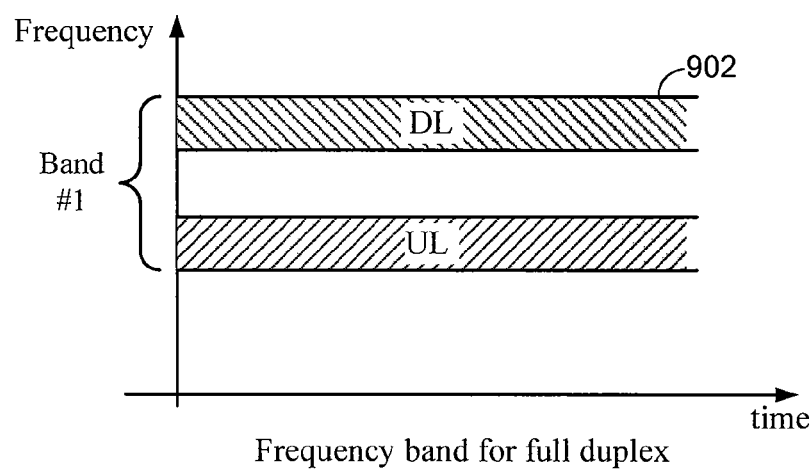
FIGS. 9A-B illustrate an example of enabling coexistence of HD operations and FD operations in a same carrier, in accordance with certain aspects of the present disclosure.
Figure 9B:
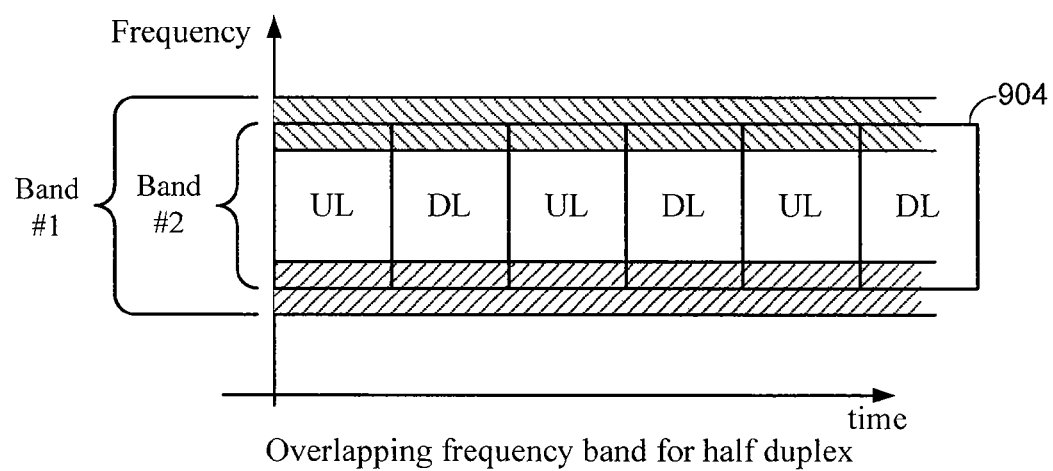

FIGS. 9A-B illustrate an example of enabling coexistence of HD operations and FD operations in a same carrier, in accordance with certain aspects of the present disclosure. FIG. 9A illustrates a frequency band 902 for FD operations with a first band number. FIG. 9B illustrates a frequency band 904 created for HD operations, overlapping the existing frequency band 902 for FD operations. For certain aspects, the frequency band 904 for HD operations may completely overlap or have a narrower bandwidth than the frequency band 902 for FD operations, as described. The frequency band 904 for HD operations may have a second band number, as illustrated. As described above, the first and second band numbers may be transmitted in an overhead message, which may allow for simultaneous operation of FD UEs and HD UEs.

For a UE that is in LTE idle state, the UE is, by definition, only receiving information from the network, e.g., system information and pages. Since there may be no UE transmissions, the HD UE may not have any limitations and may receive network transmissions in every subframe without restrictions.

However, for a UE that is in LTE connected state, whether the UE receives a page or triggers an access on itself, it may start with a random access procedure. For example, the UE may transmit a physical random access channel (PRACH) on a designated subframe (e.g., message 1 transmission from the UE). After sending message 1, the UE may not have to transmit anything until it receives message 2 from the network (e.g., message 2 reception at the UE). Therefore, there may be no restrictions in receiving message 2. Once message 2 is received at the UE, the UE may need to decode the message to determine the resources for message 3. From the reception of message 2 to the transmission of message 3 (e.g., message 3 transmission from the UE), the UE may not be expected to receive anything nor may need to transmit anything. After sending message 3, the UE may not have to transmit anything until it receives message 4 from the network (e.g., message 4 reception at the UE). Therefore, there may be no restrictions in receiving message 4 either. Once message 4 is received at the UE, the UE may need to decode the message to determine the allocated data resources. The network may configure channel quality indicator (CQI) reports, scheduling request (SR) resources, and sounding reference signal (SRS) transmissions for the UE.

For certain aspects, system information changes (e.g., signaled by way of P-RNTI (paging-radio network temporary identifier)) may occur when the network has knowledge that HD terminals are not transmitting and, therefore, are listening. However, the system information may change while the UE is transmitting a message (e.g., message 1 or 3). For some embodiments, in order to minimize missing the system information changes, the network may page multiple times. For example, the paging subframes may be subframe 9 only, subframes 4 and 9, or subframes 0, 4, 5, and 9. For some embodiments, dedicated signaling for HD UEs may be used (e.g., HD-RNTI), to address all or a group of HD UEs for signaling of, e.g., a change of system information.

While in the LTE connected state, examples of channels and signals that may be transmitted include, but are not limited to, a physical uplink shared channel (PUSCH), a physical uplink control channel scheduling request (PUCCH-SR), PUCCH-ACK, PUCCH-CQI, SRS, a periodic CQI and aperiodic SRS, and PRACH for downlink data arrival/resynchronization between the eNB and the UE (e.g., connected mode RACH). PUSCH may be the result of an UL grant four subframes before, an unscheduled re-transmission (e.g., non-positive physical hybrid ARQ indicator channel (PHICH) four subframes before), or a semi-persistent scheduling (SPS) configuration. PUCCH-SR, PUCCH-CQI, and SRS may be the result of a higher layer configuration by the network. PUCCH-ACK may be the result of DL transmissions four subframes before. Given that a SRS may be transmitted in the last SC-FDMA symbol of the subframe, the UE may choose to try to decode the DL subframe if nothing else is to be transmitted in that subframe (e.g., the eNB may determine the allocation/MCS to accommodate the loss of the last symbol and the guard time necessary to switch from reception to transmission). A periodic CQI and aperiodic SRS may be configured by the network.

While in the LTE connected state, examples of channels that may be relevant for reception generally include a PHICH (e.g., if there was a PUSCH transmission four subframes before), a physical control format indicator channel (PCFICH), a physical downlink control channel (PDCCH), and a physical downlink shared channel (PDSCH).

For some embodiments, the system information may change and UEs may be informed by paging. Since there are specific subframes for paging, these subframes may be available for the UE to listen. However, given that the paging subframes may have a periodicity of 10 ms and HARQ operation may have a periodicity of 8 ms, there may be subframes where HD UEs may not be able to receive pages or may not be able to transmit. Therefore, UE behavior may need to be defined to prioritize transmissions or receptions, as will be discussed further herein.

Figure 10:
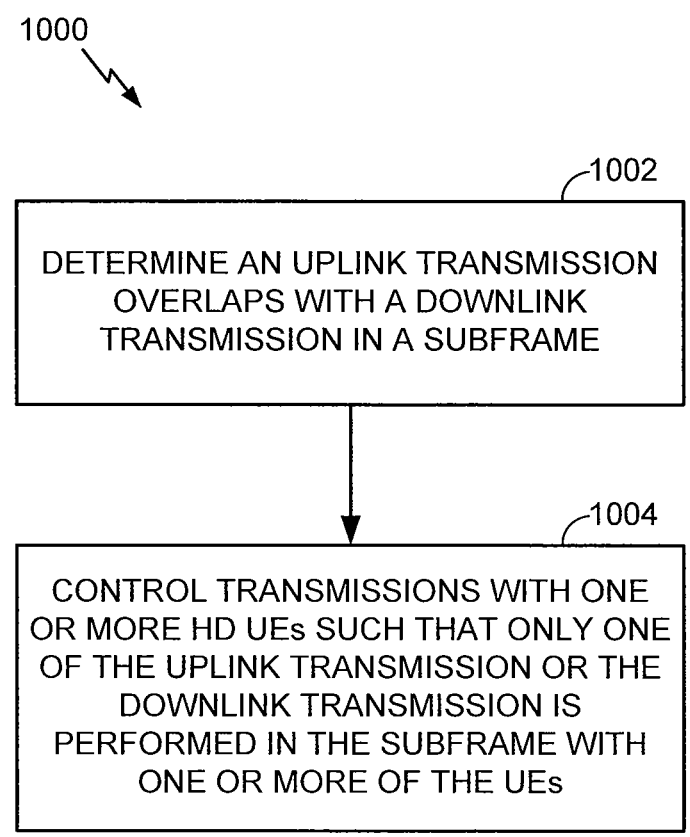
FIG. 10 illustrates example operations for controlling transmissions with one or more HD UEs, in accordance with certain aspects of the present disclosure.

FIG. 10 illustrates example operations 1000 for controlling transmissions with one or more HD UEs, in accordance with certain aspects of the present disclosure. The operations 1000 may be performed, for example, by an eNB. At 1002, the eNB may determine that an uplink transmission overlaps with a downlink transmission in a subframe. As examples, the downlink transmission generally includes a paging message indicating a system information change, and the uplink transmission generally includes an uplink hybrid automatic retransmission request (HARQ) operation. For certain aspects, determination of the overlap generally includes comparing CQI report differences in CSI reporting subsets from the one or more HD UEs, and determining incompatible downlink/uplink allocations between the one or more HD UEs.

At 1004, the eNB may control transmissions with the one or more HD UEs such that only one of the uplink transmission or the downlink transmission is performed in the subframe with one or more of the UEs. For some embodiments, controlling generally includes suspending the other one of the uplink transmission or the downlink transmission for transmission in a later subframe. For some embodiments, controlling generally includes prioritizing the uplink transmission or the downlink transmission over the other.

The transmissions of CQI and SR may be configured by higher layers with periodicities being multiples or submultiples of 10 ms (e.g., 2 ms or 5 ms). These transmissions may condition the setting of subframes to "UL" and may be chosen to avoid the paging subframes, which also roll-over with 10 ms periodicity. Therefore, the transmission of CQI and SR may not interfere in any way with the reception of paging subframes as they can be properly separated without sliding effects (discussed below). The UL subframes may be used for PUSCH transmissions, with the understanding that the corresponding UL grant (e.g., four subframes before) may occur in a "DL" subframe.

FIG. 11 illustrates the impact of DL assignments and UL grants in a HD operation, according to certain aspects of the present disclosure. As illustrated, the timeline associated with UL assignments 1104 may be linked to fixed 4 ms intervals (e.g., from grant, to initial transmission, to reception of DL ACKs, and to re-transmissions). However, due to the time-asynchronicity of PDSCH, the timeline associated with DL assignments 1102 may not be linked to fixed 4 ms intervals. For example, the DL retransmission that takes place at 1106 may occur after 5 ms from the PUCCH ACK 1108.

For some embodiments, if the DL retransmissions are chosen to follow the same timeline as the UL, a perfect split of UL/DL resources may be attained, as illustrated in FIG. 12 (e.g., for every four subframes, the UE may switch between UL and DL resources).

Given that there are two timelines (e.g., HARQ operation for UL retransmissions over an 8 ms basis and paging subframes for DL reception over a 10 ms basis), the two timelines may slide over each other. For some embodiments, the eNB may suspend retransmissions that would fall into paging subframes by properly sending a NACK on the preceding PHICH. For some embodiments, the eNB may prioritize at least one of retransmitting PUSCH and receiving pages over the other.

For certain aspects, PUSCH may be scheduled in subframes where other UL PHY channels are transmitted. For example, PUSCH may be scheduled in a subframe where PUCCH or SRS are transmitted, since that subframe may be an UL subframe. HD operation inherently utilizes only half of the system resource per UE compared to FD operation. Therefore, an eNB may efficiently utilize frequency time resources by balancing different users.

Due to reduced UL-DL interference reduction in HD UEs, DL receiver performance of a UE may be compromised when another UE is transmitting in close proximity. Due to load balancing, the eNB may offset the DL and UL subframes between different UEs, which can lead to coexistence problems. For certain aspects, the eNB may have algorithms that can discover such issues and make appropriate scheduling changes. For example, the eNB may use different scheduling sets and may configure the UEs with different CSI reporting subsets. Then by comparing the CQI report difference in the different CSI reporting subsets from a given UE, the eNB may infer the proximity of another UE with an incompatible DL/UL allocation and may change the allocation of the target UE.

Proper radio resource management (RRM) functionality may require the availability of a sufficient number of DL subframes for measurements. It may or may not be needed to designate a subset of subframes that are available for DL measurements for RRM purposes. In lack of a designated subset, the eNB may make subframes available dynamically by scheduling. Due to the need for PDCCH/PHICH operation to support the UL, the UL subframe ratio relative to the total may not be greater than 50%. This already ensures that there may be a sufficient number of DL subframes available for measurements. However, it should also be assured that there is opportunity to measure subframes containing PSS/SSS of neighbor cells. This may be accomplished in time synchronous networks. However, in asynchronous networks, the measurement opportunities may be created in a diversified way so that the UE can measure cells with arbitrary timing offsets relative to the current serving cell.

In order to properly support eNB scheduling operations, the expected UE switch times may need to be accounted for. For example, when a DL subframe is followed immediately by an UL subframe, the DL subframe may be partially erased in the UE receiver, which the eNB may consider in the DL modulation and coding scheme (MCS) selection. To facilitate the proper MCS back-off, the information required by the eNB generally includes the UE switch time (e.g., should have standardized performance requirements), UL-DL timing advance, and the UE capability to null log-likelihood ratios (LLRs).

For the UL-DL timing advance, although the eNB issues time advance commands, the eNB may not know the current time offset within the UE due to the differential nature of timing adjustment updates. Therefore, it may be useful to have a current timing advance information feedback from the UE to the eNB. Alternatively, the eNB may periodically request the UE to perform a PRACH procedure to establish the current timing advance. The eNB may estimate the timing advance from the reported UE power headroom (e.g., larger headroom may be a smaller timing advance), although this method may not be reliable. For some embodiments, the eNB may make a worst case assumption based on knowing the eNB coverage radius.

For the UE capability to null LLRs, the UE may have a capability to connect the receive power to transmit power offset and receive to transmit timing offset in order to determine the need of scaling down or zeroing the receive LLRs whenever it is known to the UE that the receive signal is not reliable due to HD interference. There may be standardized requirements to ensure the UE has such capability. Due to the sparse nature of inserted DL reference signals, it may not be possible to measure the HD interference on a per OFDM symbol basis based on reference signal observations. The UE may be able to infer the level of interference based on a priori knowledge of signal timing and signal power levels.

Embodiments of the present disclosure provide techniques for enabling coexistence, in a given frequency band, of HD and FD terminals, by introducing new frequency bands designated for HD operation and overlapping existing frequency bands designated for FD operation. Unless the designation of the new HD frequency bands is universal (e.g., world-wide) there may be problems in roaming cases where a given frequency band is designated as HD in some country/region and as FD in some other country/region. Therefore, it may be beneficial to add the network capability to broadcast the HD support. As an example, a UE may receive a network indication in an FD band that indicates whether there is support for HD operations. As a result, if the UE supports only HD operations, the UE may be denied access and then perform network acquisition operations with another base station that does support HD operations.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for enabling coexistence of half-duplex (HD) operations and full-duplex (FD) operations in a same carrier, comprising:
    assigning a first frequency band for HD operations; and
    assigning a second frequency band for FD operations, wherein the first frequency band for HD operations overlaps the second frequency band for FD operations.

2. The method of claim 1, wherein the first frequency band for HD operations has a first band number and the second frequency band for FD operations has a second band number.

3. The method of claim 2, wherein the first and second band numbers are transmitted in an overhead message.

4. The method of claim 2, wherein the first and second band numbers allow for simultaneous operation of FD user equipments (UEs) and HD UEs.

5. The method of claim 2, wherein the first frequency band for HD operations completely overlaps the second frequency band for FD operations.

6. The method of claim 5, wherein assigning the first and second frequency bands comprises assigning a frequency band with the first band number and the second band number.

7. The method of claim 1, wherein the first frequency band for HD operations has a narrower bandwidth than the second frequency band for FD operations.

8. The method of claim 1, further comprising:
    broadcasting a network indication in the first frequency band, wherein the broadcast indicates a capability for supporting HD operations.

9. The method of claim 1, further comprising:
    receiving, from a user equipment (UE), an indication of whether the UE supports HD operations or FD operations; and
    scheduling the UE in the first or second band based on whether the UE supports HD operations or FD operations.

10. The method of claim 1, further comprising:
    broadcasting a network indication in the second frequency band for FD operations, wherein the broadcast indicates whether there is support for HD operations.

11. The method of claim 10, wherein if the broadcast indicates there is no support for HD operations, further comprising:
    denying access to a user equipment (UE) that only supports HD operations.

12. An apparatus for enabling coexistence of half-duplex (HD) operations and full-duplex (FD) operations in a same carrier, comprising:
    means for assigning a first frequency band for HD operations; and
    means for assigning a second frequency band for FD operations, wherein the first frequency band for HD operations overlaps the second frequency band for FD operations.

13. The apparatus of claim 12, wherein the first frequency band for HD operations has a first band number and the second frequency band for FD operations has a second band number.

14. The apparatus of claim 13, wherein the first and second band numbers are transmitted in an overhead message.

15. The apparatus of claim 13, wherein the first and second band numbers allow for simultaneous operation of FD user equipments (UEs) and HD UEs.

16. The apparatus of claim 13, wherein the first frequency band for HD operations completely overlaps the second frequency band for FD operations.

17. The apparatus of claim 16, wherein the means for assigning the first and second frequency bands comprises means for assigning a frequency band with the first band number and the second band number.

18. The apparatus of claim 12, wherein the first frequency band for HD operations has a narrower bandwidth than the second frequency band for FD operations.

19. The apparatus of claim 12, further comprising:
means for broadcasting a network indication in the first frequency band, wherein the broadcast indicates a capability for supporting HD operations.

20. The apparatus of claim 12, further comprising:
means for receiving, from a user equipment (UE), an indication of whether the UE supports HD operations or FD operations; and
means for scheduling the UE in the first or second band based on whether the UE supports HD operations or FD operations.

21. The apparatus of claim 12, further comprising:
means for broadcasting a network indication in the second frequency band for FD operations, wherein the broadcast indicates whether there is support for HD operations.

22. The apparatus of claim 21, wherein if the broadcast indicates there is no support for HD operations, further comprising:
means for denying access to a user equipment (UE) that only supports HD operations.

23. An apparatus for enabling coexistence of half-duplex (HD) operations and full-duplex (FD) operations in a same carrier, comprising:
at least one processor configured to:
assign a first frequency band for HD operations; and
assign a second frequency band for FD operations, wherein the first frequency band for HD operations overlaps the second frequency band for FD operations; and
a memory coupled to the at least one processor.

24. The apparatus of claim 23, wherein the first frequency band for HD operations has a first band number and the second frequency band for FD operations has a second band number.

25. The apparatus of claim 24, wherein the first and second band numbers are transmitted in an overhead message.

26. The apparatus of claim 24, wherein the first and second band numbers allow for simultaneous operation of FD user equipments (UEs) and HD UEs.

27. The apparatus of claim 24, wherein the first frequency band for HD operations completely overlaps the second frequency band for FD operations.

28. The apparatus of claim 27, wherein the at least one processor configured to assign the first and second frequency bands comprises assigning a frequency band with the first band number and the second band number.

29. The apparatus of claim 23, wherein the first frequency band for HD operations has a narrower bandwidth than the second frequency band for FD operations.

30. The apparatus of claim 23, wherein the at least one processor is configured to:
broadcast a network indication in the first frequency band, wherein the broadcast indicates a capability for supporting HD operations.

31. The apparatus of claim 23, wherein the at least one processor is configured to:
receive, from a user equipment (UE), an indication of whether the UE supports HD operations or FD operations; and
schedule the UE in the first or second band based on whether the UE supports HD operations or FD operations.

32. The apparatus of claim 23, wherein the at least one processor is configured to:
broadcast a network indication in the second frequency band for FD operations, wherein the broadcast indicates whether there is support for HD operations.

33. The apparatus of claim 32, wherein if the broadcast indicates there is no support for HD operations, the at least one processor is configured to:
deny access to a user equipment (UE) that only supports HD operations.

34. A computer-program product for enabling coexistence of half-duplex (HD) operations and full-duplex (FD) operations in a same carrier, comprising:
a non-transitory computer-readable medium having code for:
assigning a first frequency band for HD operations; and
assigning a second frequency band for FD operations, wherein the first frequency band for HD operations overlaps the second frequency band for FD operations.

35. The computer-program product of claim 34, wherein the first frequency band for HD operations has a first band number and the second frequency band for FD operations has a second band number.

36. The computer-program product of claim 35, wherein the first and second band numbers are transmitted in an overhead message.

37. The computer-program product of claim 35, wherein the first and second band numbers allow for simultaneous operation of FD user equipments (UEs) and HD UEs.

38. The computer-program product of claim 35, wherein the first frequency band for HD operations completely overlaps the second frequency band for FD operations.

39. The computer-program product of claim 38, wherein the code for assigning the first and second frequency bands comprises code for assigning a frequency band with the first band number and the second band number.

40. The computer-program product of claim 34, wherein the first frequency band for HD operations has a narrower bandwidth than the second frequency band for FD operations.

41. The computer-program product of claim 34, further comprising code for:
broadcasting a network indication in the first frequency band, wherein the broadcast indicates a capability for supporting HD operations.

42. The computer-program product of claim 34, further comprising code for:
receiving, from a user equipment (UE), an indication of whether the UE supports HD operations or FD operations; and
scheduling the UE in the first or second band based on whether the UE supports HD operations or FD operations.

43. The computer-program product of claim 34, further comprising code for:
 broadcasting a network indication in the second frequency band for FD operations, wherein the broadcast indicates whether there is support for HD operations.

44. The computer-program product of claim 43, wherein if the broadcast indicates there is no support for HD operations, further comprising code for:
 denying access to a user equipment (UE) that only supports HD operations.

* * * * *